July 30, 1957 — H. T. HARMON — 2,800,746
FROST PREVENTER
Filed April 12, 1955 — 2 Sheets-Sheet 1
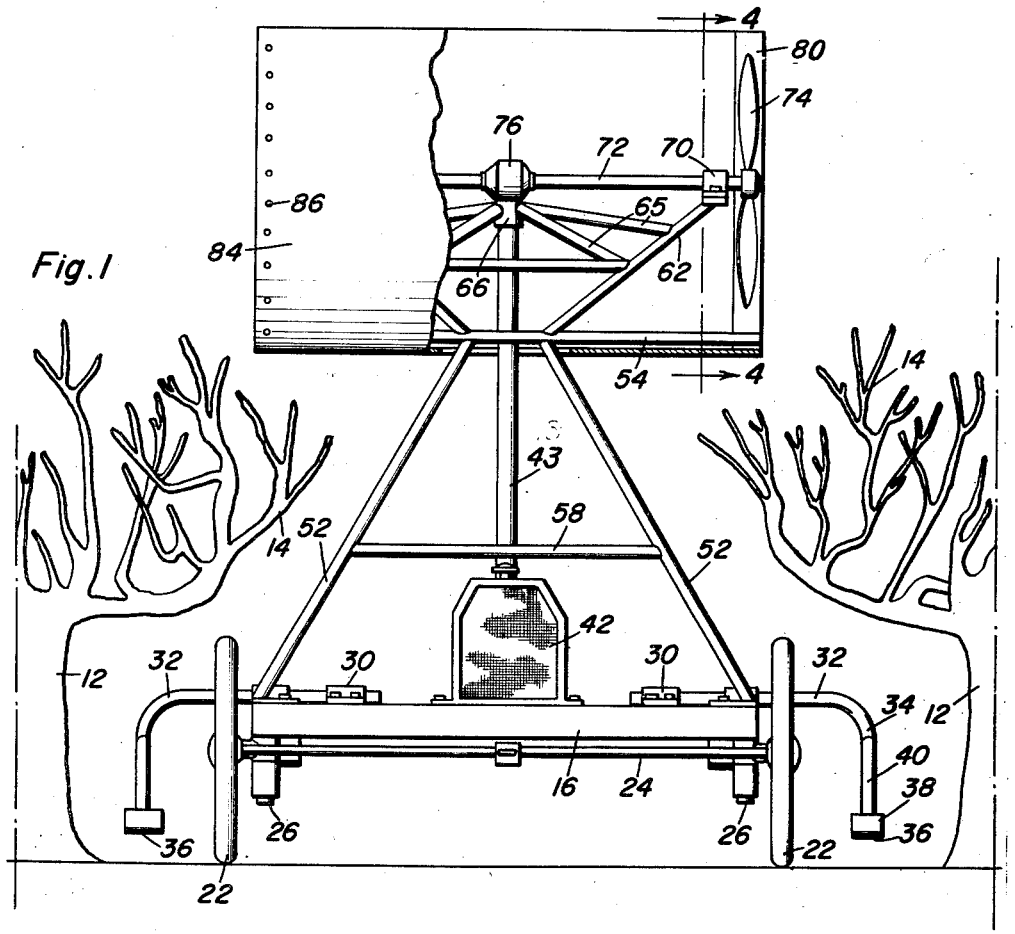
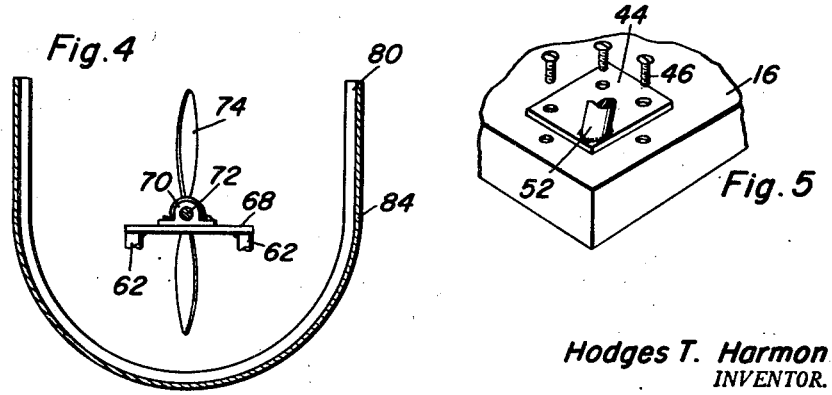
Hodges T. Harmon
INVENTOR.

July 30, 1957 H. T. HARMON 2,800,746
FROST PREVENTER

Filed April 12, 1955 2 Sheets-Sheet 2

Hodges T. Harmon
INVENTOR.

BY *Clarence A. O'Brien*
*and Harvey B. Jackson*
Attorneys

United States Patent Office 2,800,746
Patented July 30, 1957

2,800,746

FROST PREVENTER

Hodges T. Harmon, Lexington, S. C.

Application April 12, 1955, Serial No. 500,910

3 Claims. (Cl. 47—2)

This invention generally relates to a frost preventer, and more specifically provides a mobile machine for use in conjunction with fruit orchards and has for its general purpose the conditioning of atmospheric conditions directly affecting the trees in the orchards.

An object of the present invention is to provide a frost preventer mounted on a movable frame or wagon which includes a vertically upstanding tower or framework which tapers inwardly for movement between adjacent trees in an orchard together with a pair of air impellers or propellers mounted on the upper end of the framework for agitating the air above the fruit trees, thereby preventing frost injury to the trees since it is well known that air movement will prevent frost accumulation and injury caused thereby.

Another object of the present invention is to provide a frost preventer having an object as preceding together with a generally U-shaped trough member underlying the propellers and partially surrounding the same so that the air forced outwardly by the propellers will be drawn from above the propellers, thereby assuring that the warmish and drier upper air will be spread for further enhancing the frost preventing characteristics of the device, and protecting the operator of the pulling vehicle from cold drafts and wind which would otherwise be drawn upwardly by the propellers.

Yet another important object of the present invention is to provide a frost preventer having a mobile frame together with outrigger skids for preventing accidental tipping over of the device while positioned on uneven terrain, such as in a hillside orchard.

Yet another important feature of the present invention resides in the detachability of the entire apparatus from the mobile frame permitting the frame to be utilized for other purposes and permitting the power source to be utilized for other surfaces.

Other important objects of the present invention will reside in its simplicity of construction, maneuverability in a fruit orchard, ruggedness, adaptation for its specific purposes and its relatively inexpensive manufacturing and maintenance costs.

These together with other objects and advantages which will become subsequently apparent reside in the details of the construction and operation as more fully hereinafter described and claimed, reference being had to the accompanying drawings forming a part hereof, wherein like numerals refer to like parts throughout, and in which:

Figure 1 is an end elevational view of the frost preventer of the present invention with a portion of the trough thereof broken away showing the details of construction of the upwardly extending framework and the relationship thereof to the adjacent trees in a fruit orchard;

Figure 4 is a vertical sectional view taken substantially upon a plane passing along section line 4—4 of Figure 1 showing the details of construction of the U-shaped trough surrounding a portion of the propellers and the propeller mounting means; and Figure 5 is a detail perspective view showing the detachable engagement of the lower end of the framework to the mobile frame.

Figure 2:
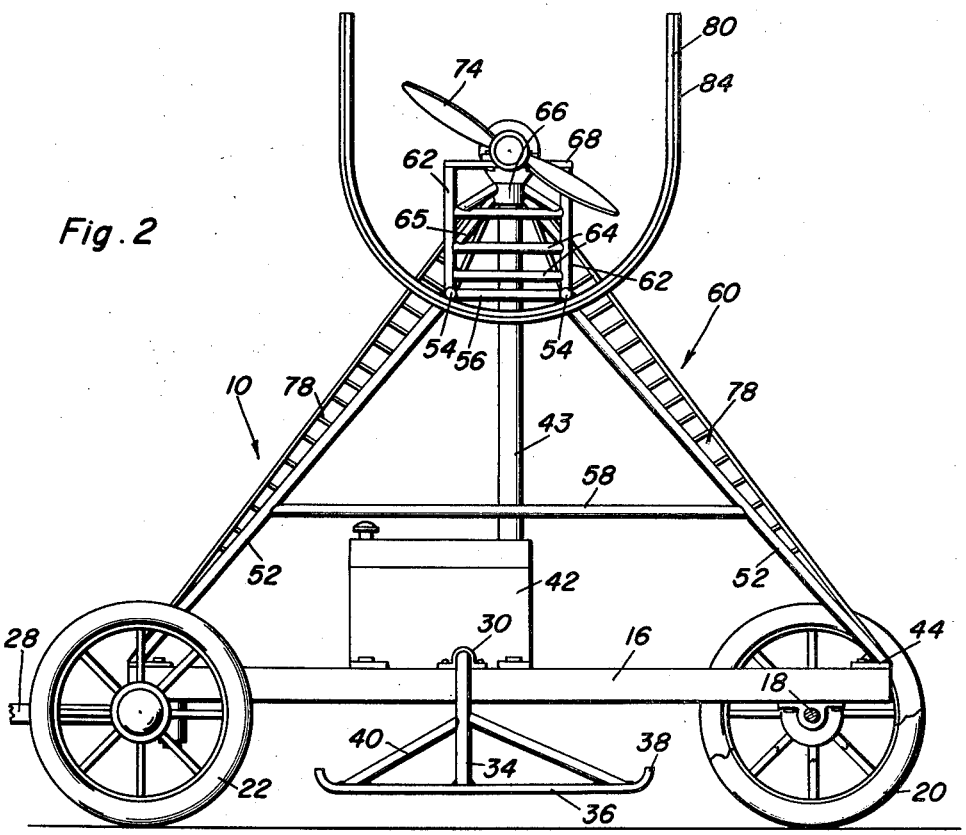
Figure 2 is a side elevational view of the frost preventer of the present invention.
Figure 3:
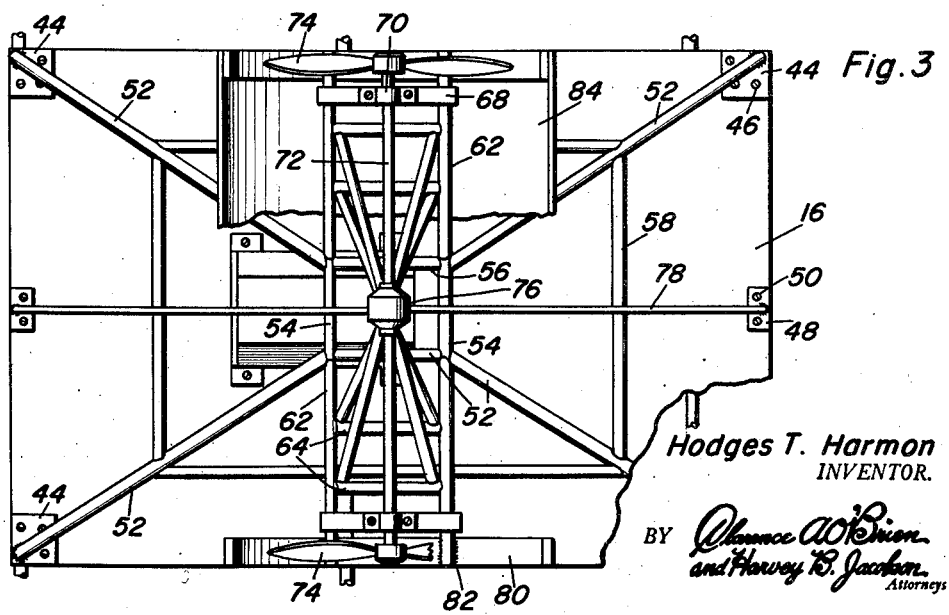
Figure 3 is a top plan view of the construction of Figure 2 with portions thereof being broken away showing the details of construction of the framework.

Referring now specifically to the drawings, it will be seen that the numeral 10 generally designates the frost preventer of the present invention for use in a fruit orchard having spaced fruit trees 12 which are normally positioned in aligned rows and are provided with outwardly extending branches 14 which prevent the passage of enlarged vehicles therebetween.

The frost preventer 10 of the present invention generally includes a frame 16 having a transverse axle 18 journaled at the rear thereof with ground engaging wheels 20 mounted on the outer end thereof. The forward end of the frame 16 is provided with guiding wheels 22 interconnected by a tie rod 24 and the wheels 22 are mounted on vertical pins 26 for guiding the movement of the frame 16. A forwardly extending tongue 28 is provided on the tie rod 24 for moving the frame 16 and also for guiding the same.

Disposed substantially at the center on the upper surface of the frame 16 is a pair of brackets 30 adjacent each side edge of the frame 16 wherein each pair of brackets 30 supports an outwardly extending mounting rod 32 having a depending outer end 34 which supports a horizontally disposed skid 36 having upturned remote ends 38 and braces 40 interconnecting the upper surface of the skids 36 and the vertical portions 34 of the mounting rods 32, thereby providing outrigger skids for preventing accidental tipping over of the frame 16 when on uneven terrain, such as in a hillside orchard.

Detachably mounted centrally on the upper surface of the frame 30 is a motor 42 of any suitable type having a power take-off and a drive shaft disposed in a tubular housing 43 extending vertically therefrom in the center of the frame 16.

Disposed at each corner of the frame 16 is a bracket plate 44 detachably secured to the frame 16 by removable screw threaded fasteners 46. Also, a smaller plate bracket 48 is provided at the front and rear edges of the frame 16 along the longitudinal center thereof which are secured to the upper surface of the frame 16 by detachable fastening members 50.

Extending upwardly and inwardly from each of the bracket plates 44 is an elongated rod 52. The elongated rods 52 converge upwardly and inwardly and the rods 52 at each end of the frame 16 are interconnected by a pair of horizontal transverse support rods 54. The horizontal brace rods 54 are interconnected and braced by a pair of longitudinal brace rods 56 which are connected to the horizontal support rods 54 in alignment with the upper ends of the inclined rods 52. Also extending between the inclined rods 52 is a plurality of horizontal brace members 58 disposed substantially at the midpoint of the inclined rods 52, thereby forming a rigid support structure in the form of a framework which is generally designated by the numeral 60.

Extending upwardly from each of the horizontal support rods 54 is a pair of outwardly and upwardly inclined rods 62. The rods 62 are secured to the support rods 54 substantially at the point of contact between the inclined rods 52 and the transverse support rods 54. The rods 62 are inclined outwardly in substantially the same plane as the horizontal support rods 54 and are interconnected by a plurality of transverse brace rods 64 thereby forming a rigid structure. The brace rods 64 extend radially inwardly toward the center of the framework 60 and are secured to an annular ring 66 which is disposed in surrounding relation to the vertical housing 44.

The outer ends of the upwardly and outwardly inclined rods 62 are provided with transverse supporting bars 68 having a bearing 70 mounted thereon for rotatably journaling a transverse shaft 72 therein. The remote ends of the transverse shaft 72 are provided with propellers or air impeller 74 which face in opposite directions for forcing air in opposite directions. The center of the shaft 72 is provided with a housing 76 which is connected to the housing 44 for housing the drive shaft and the gearing mechanism for rotating the transverse shaft 72.

Extending upwardly in an inclined relation from the bracket plates 48 is a pair of skeletonized reinforced girder-like struts 78 for adding additional rigidity to the framework 60.

The outer ends of the transverse and horizontal support rods 54 are connected to U-shaped frame members 80, as by welding 82, wherein the U-shaped frame members 80 are provided with a generally U-shaped trough member 84 secured thereto by fastening means 86. The U-shaped trough member 84 extends completely around the major portion of the circle defined by the propeller 74 and leaves only the upper portion of the propellers 74 open for intake of air, thereby assuring that the air will be moved from above the frost preventing machine 10 outwardly over the trees 12 for preventing the accumulation of frost and the injury caused thereby.

In practical use of the invention, the machine 10 is pulled through the orchard between adjacent trees 12 and the upwardly converging relation of the framework permits the movement of the device through relatively closely spaced trees with the propellers and the trough disposed generally above the trees. The generally U-shaped trough which extends up to the tip of the propellers 74 will draw the lighter and warmer air from above the propellers for forcing the warmer air out over the trees 12 rather than the colder air from a position adjacent the ground. The outriggers having the skids 36 mounted thereon prevent accidental tipping of the entire device while in uneven terrain and the particular nature of the device permits the use of such an apparatus in conjunction with peach trees which spread notoriously, thereby generally preventing the passage of frost preventing vehicles. Of course, the framework 60 together with the motor 42 and the outriggers 36 are detachable from the surface of the frame 16, thereby permitting the frame 16 to be utilized in a normal manner and to permit the motor and the other portions of the device to be utilized separately for any particular purpose desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A frost preventer comprising a mobile frame, an upstanding framework mounted on said frame, a pair of oppositely and outwardly facing propellers mounted on said framework for rotation in a vertical plane, means for driving said propellers, and a trough member underlying the propellers for assuring the propellers will move the warmer air above the propellers outwardly for preventing frost in orchards, said propellers being secured to the remote ends of a rotatable shaft, a driving motor detachably secured to said frame, and a generally vertical drive shaft interconnecting said motor and rotatable shaft for simultaneously driving said propellers for moving air outwardly in opposite directions.

2. An air moving device for preventing frost in orchards comprising a mobile frame, ground engaging wheels on said frame, an upstanding framework on said frame, an air impelling apparatus on the upper end of the framework, a cover for the lower portion of the apparatus to control the intake thereof, power means on said frame, and means interconnecting the power means and power apparatus for driving the same, said framework being detachably secured to said mobile frame, said mobile frame having outwardly extending skids to prevent accidental tipping over of the frame when on uneven terrain, said air impelling apparatus being disposed adjacent the top of the trees for moving the warm air from above the apparatus outwardly over the trees for preventing frost, said air impelling apparatus including a pair of oppositely and outwardly facing air propellers, a shaft supporting said propellers for simultaneous rotation, said propellers forcing air outwardly in opposite directions.

3. In a frost preventer, a mobile frame, an upstanding frame on said mobile frame, an open top horizontal trough extending transversely of said mobile frame and mounted in elevated position on said upstanding frame with open ends at opposite sides of the mobile frame, a horizontal shaft in said trough extending longitudinally therein and rotatably mounted on said upstanding frame, a pair of vertical oppositely and outwardly facing air propellers fixed on opposite ends of said shaft in the ends of said trough, and power means on said mobile frame operatively connected to said shaft.

References Cited in the file of this patent

UNITED STATES PATENTS

| | | |
|---|---|---|
| 261,389 | Schneider | July 18, 1882 |
| 641,990 | Neyens | Jan. 23, 1900 |
| 1,314,173 | Waller | Aug. 26, 1919 |
| 1,372,793 | Andersson | Mar. 29, 1921 |
| 1,451,994 | Mackenzie | Apr. 17, 1923 |
| 1,522,667 | Barducci | Jan. 13, 1925 |
| 1,903,615 | Towt | Apr. 11, 1933 |
| 2,300,475 | Ward | Nov. 3, 1942 |
| 2,598,544 | Holman | May 27, 1952 |
| 2,602,267 | Neundorfer | July 8, 1952 |
| 2,608,441 | Daugherty | Aug. 26, 1952 |